United States Patent

Kenner

[15] 3,693,176

[45] Sept. 19, 1972

[54] READ AND WRITE SYSTEMS FOR 2 1/2D CORE MEMORY

[72] Inventor: Bernard A. Kenner, Palos Verdes Peninsula, Calif.

[73] Assignee: Electronic Memories and Magnetics Corporation, Los Angeles, Calif.

[22] Filed: April 6, 1970

[21] Appl. No.: 25,624

[52] U.S. Cl.....................340/174 LA, 340/174 TB, 340/174 DA, 340/174 M, 340/174 NC

[51] Int. Cl...........................G11c 11/06, G11c 5/02

[58] Field of Search...340/174 LA, 174 TB, 174 DA, 340/174 NC, 174 M

[56] References Cited

UNITED STATES PATENTS

| | | | |
|---|---|---|---|
| 3,419,856 | 12/1968 | Doughty | 340/174 TB |
| 3,466,626 | 9/1969 | Ulzurrun | 340/174 LA |
| 3,425,044 | 1/1969 | Ferrier et al. | 340/174 TB |
| 3,544,978 | 12/1970 | McLean et al. | 340/174 LA |
| 3,543,256 | 11/1970 | Genke | 340/174 M |
| 3,550,100 | 12/1970 | Fausett | 340/174 M |
| 3,573,761 | 2/1971 | Genke | 340/174 LA |
| 3,466,633 | 9/1969 | Gilligan et al. | 340/174 LA |
| 3,540,015 | 11/1970 | Nissen | 340/174 LA |
| 3,568,170 | 3/1971 | Catalani, Jr. | 340/174 LA |

*Primary Examiner*—Stanley M. Urynowicz, Jr.
*Attorney*—Lindenberg, Freilich & Wasserman

[57] ABSTRACT

An organization is disclosed for driving bit lines of 2-wire or 3-wire, 2 1/2D coincident current core memory systems using paired rails for a plurality of bit drive lines, and a separate transformer to energize each pair of rails with opposite polarities for each read or write operation. In a 2-wire system, two conjugate lines connected to one rail of a pair and associated with a given bit position of separate word groups are connected to two conjugate lines connected to the other rail of a pair and associated with an adjacent bit position of the same word groups through a selection switch connecting single output terminals of baluns at the ends of the conjugate lines so that current through two conjugate lines is returned through the other two conjugate lines. In a 3-wire system, a single bit line connected to one rail is connected to a single line connected to the other of a pair of rails by a selection switch for the same purpose.

15 Claims, 5 Drawing Figures

INVENTOR.
BERNARD A. KENNER

BY

Lindenberg, Freilich & Wasserman

ATTORNEYS

INVENTOR.
BERNARD A. KENNER
BY
Lindenberg, Freilich & Wasserman
ATTORNEY

INVENTOR.
BERNARD A. KENNER
BY
Lindenberg, Freilich & Wasserman
ATTORNEYS

INVENTOR.
BERNARD A. KENNER
BY
Lindenberg, Freilich & Wasserman
ATTORNEYS

READ AND WRITE SYSTEMS FOR 2 1/2D CORE MEMORY

BACKGROUND OF THE INVENTION

This invention relates to an organization for a coincident-current magnetic core memory of the type commonly referred to as a 2 ½D memory system, as opposed to a 3D system for a conventional coincident current core memory or a 2D system for a conventional linear select core memory.

In a 2 ½D memory system, selected orthogonal (X and Y) drive lines are energized with half-select current of the same polarity or sense through toroidal cores in an array of a given dimension (row or X drive line) to read binary digits of a word, one digit per column (Y drive line) energized. In a 2-wire, 2 ½D memory system, the selected bit lines are energized first with a current pulse to facilitate sensing a binary digit read on a given bit drive line. After the transients of that first current pulse have subsided, the selected word line is energized with a current pulse while half-select current at a steady level is still being driven through the bit lines. A binary 1 from a given core switched is then sensed as a pulse induced on its bit line, i.e., detected from the back EMF produced on the selected bit drive line by a core switching. In a 3-wire, 2 ½D memory system, the half-select current pulse may be applied at the same time since a binary 1 from a switched core is sensed on a third line.

In a 2-wire, 2 ½D memory system, it is customary to drive bit lines associated with other word lines in pairs using a balun in the form of a balanced transformer having a secondary winding connected to a sense amplifier. A single line out of the primary winding of the balun is connected to a current sink while two lines into the primary winding are connected to conjugate bit lines. The pairing of bit lines is, of course, between bit lines for corresponding bit positions in separate word locations. By placing each of the conjugate bit lines for one word on one plane, and each of the conjugate bit lines for the other word on a separate plane, separate word drive lines can be readily provided to selectively read out one of the two words. A given bit of a word selectively read out is then sensed as a pulse induced in the secondary winding of the balun.

To store a binary digit in a particular bit position of a word location, the selection of the core in that bit position is the same as for a read cycle, but the currents are reversed and the bit drive current is applied only if the digit to be stored is a binary 1. Thus, the same addressing circuits may be used with bi-polar bit drivers if the write cycle timing signal is conditionally applied to respective bit drivers.

System organization of a 2 ½D memory is quite flexible since only two orthogonal lines intersect at each core of an array of rows and columns. The major considerations are the number of components needed to selectively drive the word and bit drive lines, and the length of the drive lines. For selection, one technique commonly used employs two selection diodes at the drive end, each connected to a current driver of different polarity by a separate transistor switch to selectively drive one line of a group in either direction. The group is selected at the sink end of the line to be driven by activating one of two transistor switches, depending upon the polarity of the drive current.

OBJECTS AND SUMMARY OF THE INVENTION

An object of this invention is to provide an organization which reduces the number of selection transistors required to selectively drive bit lines in a 2-wire or a 3-wire, 2 ½D memory system.

Still another object is to provide a closed sense loop for data in a 2-wire, 2 ½D memory system.

Yet another object is to provide bit drive lines in a 2 ½D memory system with minimum loading from non-selected lines and provisions for effective placement of termination resistors.

These and other objects of the invention are achieved by selectively activating a transformer coupled bipolar voltage switch to energize a pair of distribution lines, or rails, and drive currents of given opposite polarities for a read cycle, and reversed opposite polarities for a write cycle. Conjugate bit drive lines of paired groups of two or four word groups are connected to each pair of rails. In a 2-wire, 2 ½D memory system, the ends of conjugate bit drive lines of a pair of four word groups are connected to two input terminals of a read balun through a first pair of selection diodes poled for forward conduction in response to read currents, and a write balun through a second pair of selection diodes poled for forward conduction in response to write currents. The baluns are of the balanced transformer type having two windings connected to a common output terminal, and in the case of read baluns, a third output winding. The output terminals of read baluns associated with adjacent odd and even bits of a given word pair are connected by a read switch, and a pulse current stabilizer in series, such that read current through conjugate bit drive lines of two word groups will return to the second rail through conjugate bit drive lines of the same two word groups. The desired word of a given group is then selected by pulsed current through a selected word drive line.

A separate sense amplifier is connected to the third winding of each read balun, and each write balun has its output terminal connected to circuit ground through a write control switch in series with a current pulse stabilizer. A single set of read and write switches, and baluns, may service a number of paired rails for a memory capacity of four RM words, where R is the number of rails, and M is the effective number of word drive lines orthogonal to a given bit drive line connected to a rail. The bit drive lines may be folded to facilitate placing a separate terminating resistor across the ends of each bit drive line.

The organization of a 3-wire, 2 ½D memory system is the same for the rails, bit lines and word drive lines, but instead of connecting paired bit drive lines to baluns, adjacent odd and even bit lines of a given word are connected by a read switch and a pulse current stabilizer. A separate sense winding provided as the third wire is connected to a sense amplifier. The same read switch thus services two word groups, instead of four as in the case of a 2-wire, 2 ½D memory system.

The novel features that are considered characteristic of this invention are set forth with particularity in the appended claims. The invention will best be understood from the following description when read in conjunction with the accompanying drawings.

DESCRIPTION OF THE PREFERRED EMBODIMENT

Figure 1:
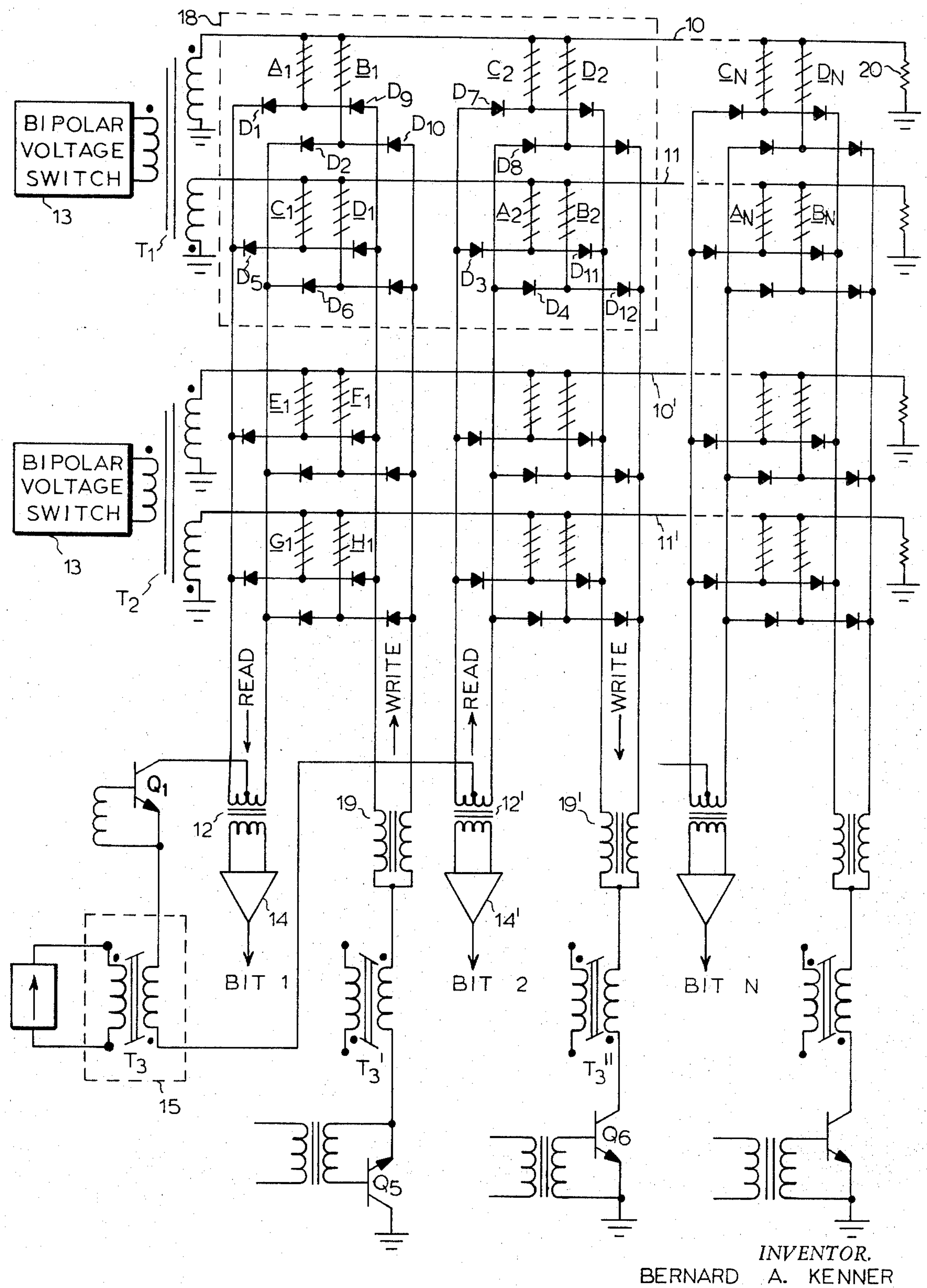
FIG. 1 is a schematic diagram of an illustrative embodiment of the present invention for selectively driving bit lines of a 2-wire, 2 ½D memory system.

Referring now to the drawings, FIG. 1 illustrates a schematic diagram of a bit-drive selection system without regard to the topological arrangement of bit drive lines. It comprises a plurality of paired distribution lines or rails such as rails 10 and 11, connected to secondary windings of transformers, such as transformer $T_1$. Although only two transformers $T_1$ and $T_2$ are shown, it should be understood that any number may be provided, depending upon the size of the memory system required. In operation, only one transformer is activated at a given time to produce a voltage pulse of one polarity for a read cycle and of opposite polarity for a write cycle, as will be described more fully with reference to FIG. 4.

Each rail services two conjugate bit drive lines for each of N bits, where N is preferably an even number, with one bit of a given word stored in a toroidal core of one line. The first two lines $A_1$ and $B_1$ store the least significant bits of word groups A and B, where each group consists of a number of words equal to the number of cores driven by the bit lines. For simplicity, only four cores are shown on each line, but it is understood that a larger number M may be provided for a total memory capacity of 4NM bits for one pair of rails. The basis for the factor 4 will presently become apparent.

The second (next more significant) bit of word groups A and B are stored in lines $A_2$ and $B_2$ connected to the rail 11. The third bit of word groups A and B are stored in lines $A_3$ and $B_3$ (not shown) connected to the rail 10, and so forth with even bits stored in conjugate lines connected to the rail 11 and odd bits stored in conjugate lines connected to the rail 10. This arrangement of alternating the connection of bit drive lines associated with word groups A and B to paired rails is desirable in order to share a read switch $Q_1$ with adjacent odd and even bit lines in accordance with one feature of the invention.

Bit drive lines for word groups C and D are similarly connected to the rails 10 and 11, but with even bit lines connected to the rail 10 and odd bit lines connected to the rail 11. In that manner, memory cores for four word groups A to D are serviced by the paired rails 10 and 11, with M words of N bits per group, for a total of 4MN bits of memory capacity, hence the factor 4.

Corresponding bit lines of word groups A and B receive bit drive currents of the same polarity, but the polarity for even bit lines is always opposite the polarity of odd bit lines owing to the opposite sense of the secondary windings of the transformer $T_1$ to which the rails are connected, as indicated by the dot convention. Thus drive currents are transmitted through conjugate lines in parallel from rail 10 to a balun 12 and returned through conjugate lines in parallel from a balun 12′ to the rail 11. For example, when a bipolar voltage switch 13 is activated during a read cycle for a positive voltage on the rail 10, positive current flows through all odd bit drive lines, such as $A_1$ and $B_1$. Selection diodes $D_1$ and $D_2$ are then forward biased to provide drive currents through lines $A_1$ and $B_1$ to the collector of the transistor $Q_1$ shown connected as a conventional floating transformer switch. For a read cycle, that switch is also activated to provide balanced currents from two input terminals of the balun 12 to an output terminal connected to the transistor $Q_1$. The balun is provided as a center tapped transformer having a third separate winding connected to a sense amplifier 14. If a binary 1 is being read from a core in one of the conjugate lines $A_1$ and $B_1$ by selective word drive current (through an orthogonal line not shown associated with just one of the bit lines), a pulse will appear as a bit 1 at the output of the amplifier 14.

The use of a balun and a sense amplifier in this manner does not constitute a feature of the present invention except in conjunction with the organization of a pair of rails for use with a single bipolar voltage switch. The amplifier 14 may be a conventional sense amplifier in the form of a high-gain differential input amplifier. Although shown as a single ended operational amplifier, it is in fact a differential output amplifier having a DC restoring circuit its input to eliminate the large differential present during a read cycle. This differential is due to an unavoidable unbalance in the resistances of the conjugate bit lines and selection diodes.

Figure 2:
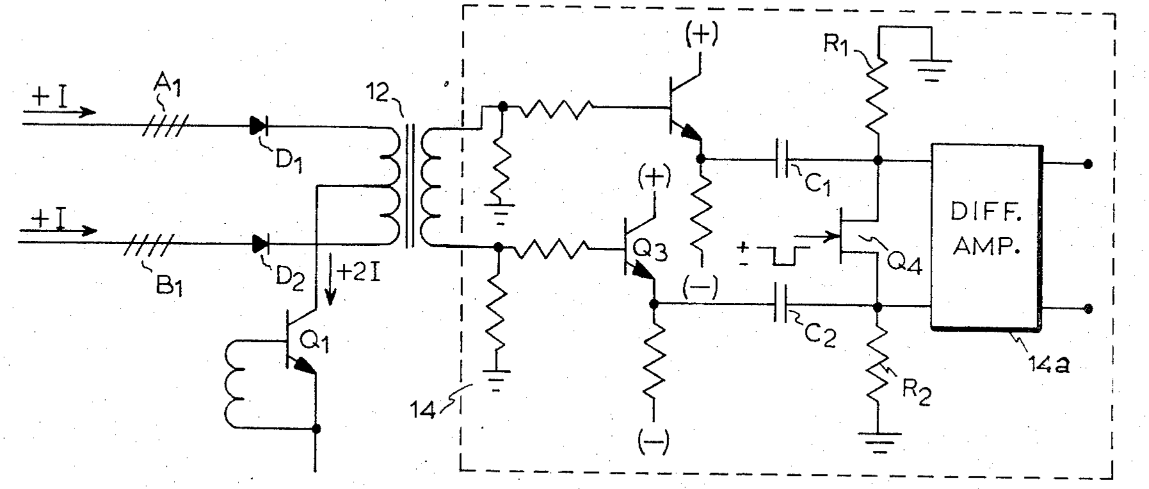
FIG. 2 is a schematic diagram for a sense amplifier employed in the system of FIG. 1.

A DC restoring circuit is illustrated in FIG. 2 for the sense amplifier 14. Assuming that bit lines $A_1$ and $B_1$ are being driven with positive current for a read cycle (in the direction indicated by arrows labeled +I), the total current through the transistor $Q_1$ is the sum (+2I) of the currents through the lines $A_1$ and $B_1$. If the resistances of the lines $A_1$ and $B_1$, and the diodes $D_1$ and $D_2$, are balanced, the two input terminals of the sense amplifier 14 will remain at the same potential with respect to circuit ground. However, since an unbalance is unavoidable, there will be a difference which would appear at the input terminals of a differential amplifier 14*a* were it not for the DC restoring circuit comprising transistors $Q_2$ and $Q_3$ connected in a common-collector (emitter-follower) configuration and a junction field effect transistor $Q_4$. A control signal to the gate of the field-effect transistor $Q_4$ is normally positive with respect to circuit ground so that any differential (typically 150 MV) at the input terminals of the amplifier 14*a* will be shunted through the channel of the field-effect transistor. Resistors $R_1$ and $R_2$ are selected to be very large (typically 5 K ohms) to provide long R-C time constants for coupling capacitors $C_1$ and $C_2$.

Once switching transients have subsided, following the initiation of a read current pulse, and the read currents through the lines $A_1$ and $B_1$ have become steady, the transistor $Q_4$ is cut off by a negative voltage at its gate. The input terminals of the differential amplifier 14a will then remain at substantially the same potential owing to the long time constants of the R-C coupling circuits. Thereafter, when read current is driven through a word drive line, and a core on one of the bit lines $A_1$ and $B_1$ is switched, a pulse will be coupled by the transformer 12 through the coupling capacitors $C_1$ and $C_2$ to the input terminals of the differential amplifier *14a*. The pulse thus sensed and amplified will appear across output terminals of the amplifier 14a for strobing into a buffer flip-flop in the usual manner.

The read-switch transistor $Q_1$ is shown having its emitter connected to the center tap of a balun 12' associated with the next even bit, through a current pulse regulator 15. In accordance with a further feature of the invention, that permits one read-switch transistor $Q_1$ to service two adjacent bits. However, the feature of having paired rails may be used to advantage without this feature by connecting the emitter of the transistor $Q_1$ to a current sink or bipolar pulsed current source in a more conventional manner. A separate read-switch transistor for each of the remaining baluns 12'–12'' would then be provided and connected to pulsed current sources of proper polarities.

The current pulse regulator 15 is comprised of a transformer $T_3$ having a square loop core biased by current from a constant current source 16 in one winding. The second winding is connected in series with the transistor $Q_1$. When the transistor conducts, current in the second winding increases until the DC bias is overcome and the magnetic field increases to the coercive force of the square loop core. At that point, the core impedance switches from a very low to a very high value to stabilize the current through the transistor at a maximum level.

While positive currents are being driven through lines $A_1$ and $B_1$ during a read cycle for a word in group A or B, negative currents are being driven through lines $A_2$ and $B_2$, from the balun 12' to rail 11 via selection diodes $D_3$ and $D_4$. Accordingly, with the read-switch transistor $Q_1$ on, the center tap of the balun 12' provides a return path for positive current through the lines $A_1$ and $B_1$.

To read a word from groups C and D, the bipolar voltage switch 13 is activated for a negative voltage on the rail 10 and a positive voltage on the rail 11. Accordingly, current flows through lines $C_1$ and $D_1$ in a positive (downward) direction through diodes $D_5$ and $D_6$, and returns through lines $C_2$ and $D_2$ via diodes $D_7$ and $D_8$ in a negative (upward) direction to the rail 10. The polarity selected for the bipolar voltage switch is thus one of the word selection coordinates in that when a voltage switch is selected for a pair of rails to address four groups of words A to D, the polarity of the voltage must be selected to limit the address to two of the four groups. The selection of one group, and one word in the group, is then finally made from the two groups by driving a single word drive line as will be described with reference to FIG. 3.

The organization and operation thus far described with reference to components in a dotted box 18 for a read cycle involving bits 1 and 2 of a word to be selected from one of four groups of words A to D, is the same for successive pairs of bits. It is for that reason that the number of bits in a word is preferably even. If N is odd, the current stabilizer for the balun associated with the last position will require a separate read switch. Other groups of words may be read in the same manner by selectively activating other bipolar voltage switches such as the voltage switch 13' that drives rails 10' and 11' for word groups E to H. A single set of read-switch transistors and baluns will service any reasonable number (R) of rail pairs, as will write switches and baluns for a write cycle. Therefore, the total bit memory capacity 4NM for a single pair of rails is increased to 4RNM when more than one transformer is provided, as contemplated in accordance with one feature of the invention.

A write cycle will now be described for bits 1 and 2 with reference to only the components in the box 18 since the system is symmetrical for bits 3 to N of any word, just as for a read cycle. Again polarity of the bipolar read switch 13 is one of the selection coordinates, but the polarity selected to store in a given word group is opposite the polarity selected to read from the same word group. Assuming the group A is selected, negative voltage is applied to the rail 10 and positive voltage to the rail 11, to forward bias diodes $D_9$ to $D_{10}$. That drives negative (upward) current in lines $A_1$ and $B_1$, and positive current in lines $A_2$ and $B_2$. Diodes $D_9$ and $D_{10}$ are connected to a balun 19 having its single-ended output connected to a current drive stabilizing transformer $T_3'$. The bias winding of the transformer $T_3'$ is connected to the constant current source 16, either in parallel or in series with bias windings of other transformers, preferably in series. A transistor $Q_5$ connected as a floating transformer switch is activated to allow negative drive current to flow through the drive lines $A_1$ and $B_1$. Diodes $D_{11}$ and $D_{12}$ are similarly connected to a balun 19' and a transistor $Q_6$ is activated to allow positive drive current to flow through lines $A_2$ and $B_2$. However, transistors $Q_5$ and $Q_6$ are only conditionally activated, depending upon whether or not a binary 1 is to be stored in the respective bit positions 1 and 2 of the selected word.

A word is selected for a write cycle by driving the appropriate word drive line with current of a polarity opposite that selected for the same word in a read cycle. In that manner, a single set of write switches and baluns service all pairs of rails, just as a single set of read switches and baluns service all pairs of rails. That provides a significant reduction of selection components by a factor of 4, because one pair of rails serves four word groups, or more, and any reasonable number of other pairs of rails may be added without increasing the number of bit drive switches and baluns.

Other advantages provided by these features are reduced overall power consumption and minimum loading from non-selected lines because of the balanced closed sense loop. The balanced currents from the drive transformers and through baluns having single ended outputs in series with current stabilizers will provide precise tolerance with minimal parasitic loading and operation at a high duty factor (up to about 85 percent) with utilization of full voltage capability for rapid rise times without introduction of severe component stress levels. The rails can be easily terminated with their characteristic impedance by resistors at their far end, such as resistor 20 at the end of rail 10, and each bit drive line may be easily terminated at both ends if folded lines are used, as shown in FIG. 3, to facilitate placing a terminating resistor across the ends, such as resistor 21 across line $A_1$.

In a typical data processing system, a word length is 20 bits. If all bit lines would then be driven by one pair of rails from a single bipolar voltage switch, the number of bit lines being driven at any one time would be 40. Rather than provide bipolar voltage switches and transformers for that large a load, it is preferred to break the words stored into sections, such as five sections of four bits each. The load on any one transformer would then be only 4 bit drive lines at any given time. For larger words, the sections may be increased in number, and each section may be increased to 6 bit lengths.

Figure 3:
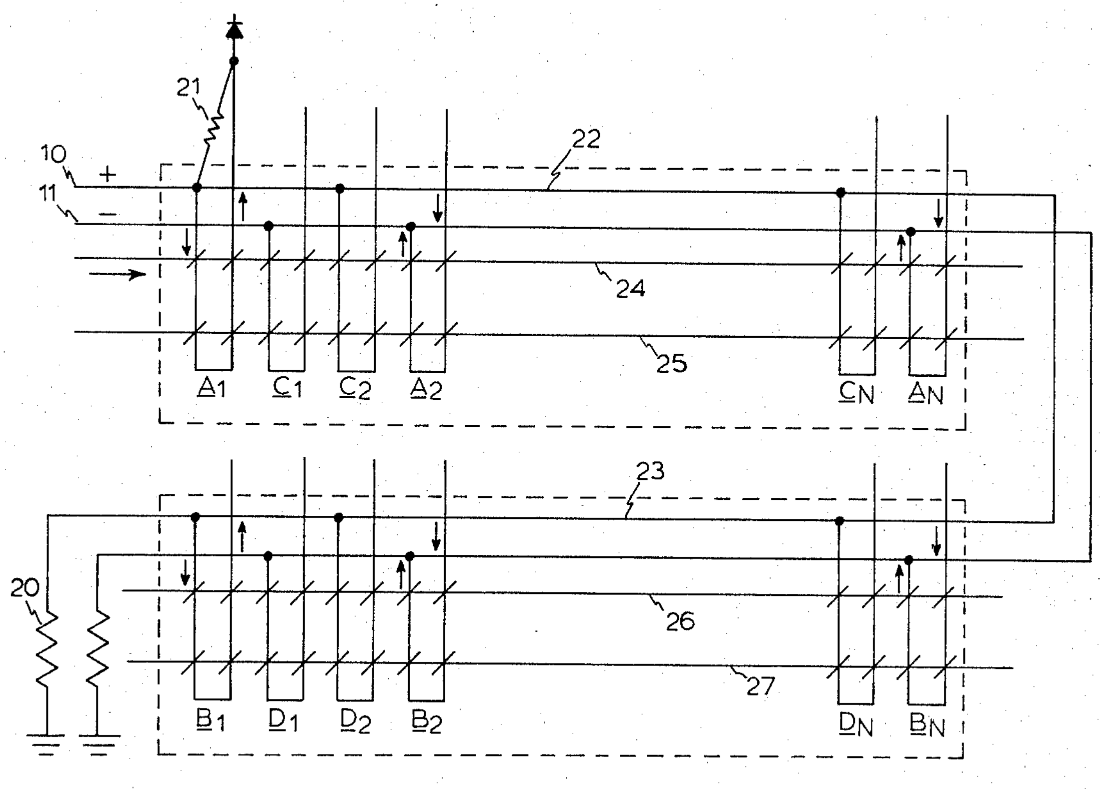
FIG. 3 shows schematically how word drive lines may be incorporated in the system of FIG. 1 with provisions for effective placement of termination resistors.

Referring now to FIG. 3, the lines of paired word groups, such as word groups A and B, are arranged in separate planes 22 and 23 of cores in order to facilitate providing orthogonal word drive lines, such as lines 24 and 25 for word groups A and C, and lines 26 and 27 for word groups B and D. Each bit drive line is folded in its core plane. In that manner, one word drive system will serve two words of two word groups by making polarity a word selection coordinate. For example, to read the first word of group A, the rails 10 and 11 are driven with the polarities shown to provide bit drive currents in the directions shown. Drive lines for word groups C and D do not conduct current because of the polarity of selection diodes shown in FIG. 1. When positive current is driven through the word line 24 in the direction shown, the first core of bit line $A_1$, and all other odd numbered lines, is switched while the last core of bit line $A_2$, and all other even numbered lines is switched to make up one word. If the word drive current is reversed, then the last core of odd numbered bit lines and the first bit of even numbered bit lines will be switched. Thus one word drive line may select one of two words, depending upon the polarity of the current selected during a read cycle. For addressing a given word during a write cycle, the selection polarity is simply reversed. The network for selection of the proper word line and polarity may be according to any conventional arrangement.

Figure 4:
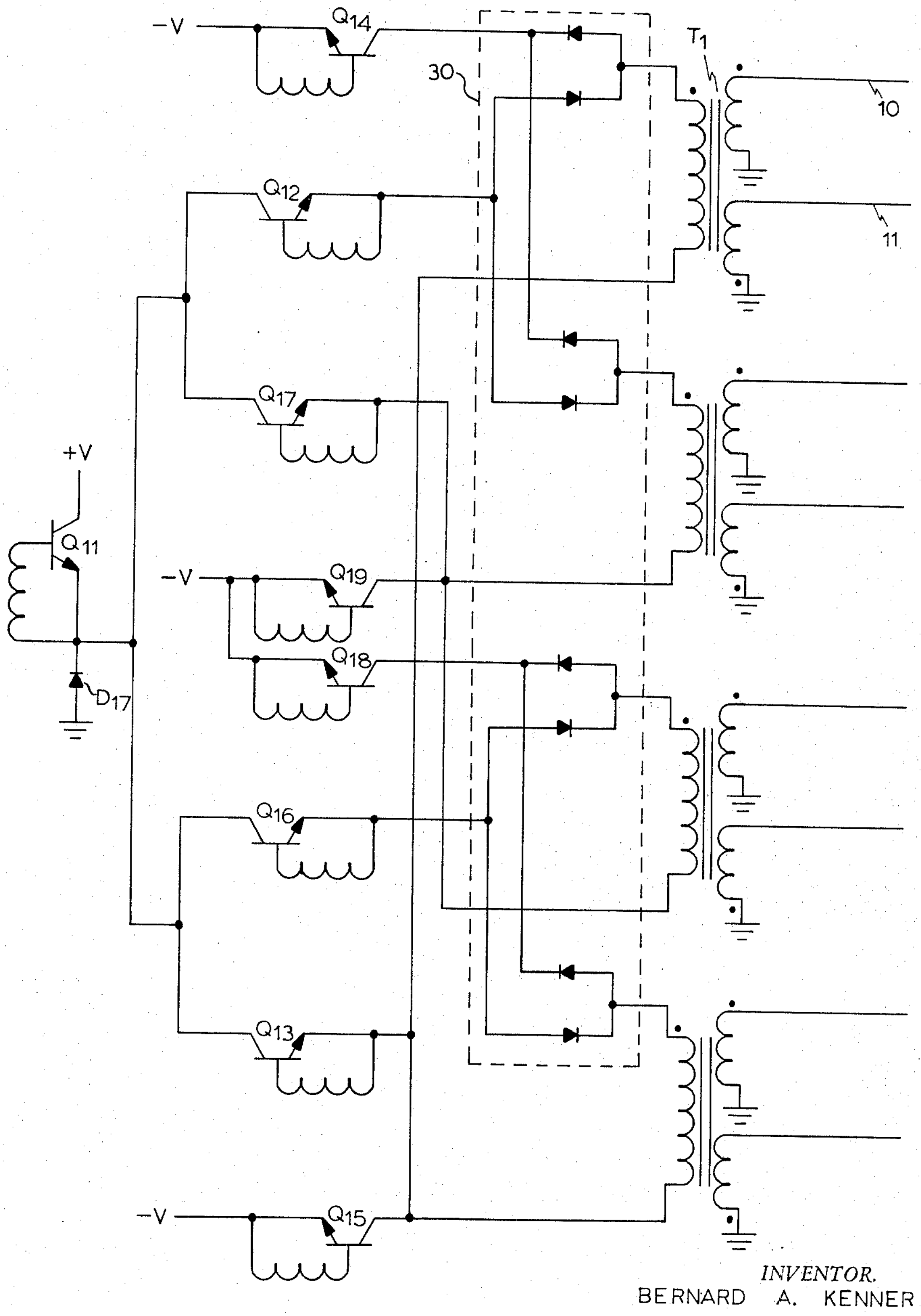
FIG. 4 is a schematic diagram of bipolar voltage switches employed in the system of FIG. 1 for bit lines.

A bipolar voltage switch, such as for the transformer $T_1$, will now be described with reference to FIG. 4. Each of the transistors $Q_{11}$ to $Q_{15}$ is assumed to be a transformer coupled floating switch for purposes of this description. Transistor $Q_{11}$ is a switch turned on during the rise of either a read or write current pulse of either polarity in the transformer $T_1$ in order that a voltage of 2V be applied across the primary winding. After the current has risen to a predetermined level, the voltage across the transformer may be reduced to V by turning off $Q_{11}$. Current return to the negative power supply $-V$ is then through a diode $D_{17}$. In practice, the time that the transistor $Q_{11}$ is left on may be different during read and write cycles to allow equal transformer flux despite unequal cycle periods.

Transistors $Q_{12}$ through $Q_{15}$ cooperate with selection diodes at opposite ends of the bit drive lines, such as diodes $D_1$ and $D_9$ at the end of line $A_1$ to form a selection matrix for switching bipolar currents through one of N pair of lines in one direction and one of N pair of lines in the opposite direction for either a read or a write cycle. Transistors $Q_{12}$ and $Q_{15}$ are activated together to provide read currents in bit drive lines of word groups A and B, and transistors $Q_{13}$ and $Q_{14}$ are activated to provide read currents in bit drive lines of word groups C and D. The selection of transistors activated is always reversed during a write cycle. In practice, a read cycle (phase of a complete memory cycle) precedes a write cycle so that the selection of transistors activated is always made for read current in the word group desired. After the read cycle has been completed, a sequence control unit for the memory system simply reverses the selection made.

By adding another set of transistor switches $Q_{16}$ to $Q_{19}$ corresponding to respective transistor switches $Q_{12}$ to $Q_{15}$ in the manner shown, four transformers may be selectively activated with voltage of selected polarity. A network 30 of selection diodes prevents sneak current paths through unselected transformers in a manner known to those skilled in the art.

Memory word locations are usually assigned addresses in numerical sequence. To facilitate addressing bit drive lines by word group, the addresses of word memory locations can be grouped in sequence for groups A, B, C and D with $2^n$ n addresses in each group. Then the bits in positions $n+2$ and $n+1$ are 00, 01, 10 and 11 for groups A, B, C and D, respectively. Therefore, to select the word groups in pairs (A, B) and (C, D), it is simply necessary to look at the bit in position $n+2$ of an address word. Since each transformer (rail pair) will have four word groups, the same scheme can be used to address rail pairs if word groups are assigned to successively numbered rail pairs. Thus the bit positions of higher order than bit $n+2$ in an address word may be employed to selectively actuate a bipolar voltage switch for the word group to be addressed. To make final selection of the word location to be addressed, bits 1 to $n+1$ may be used in a conventional manner to select a particular word drive line.

Once the decoding has taken place and the appropriate transistors of the voltage switches have been activated, a voltage of 2V/m appears across each of the two secondary windings of the selected transformer during the current rise time, where m is a turns ratio selected to allow the desired number B of bit lines to be connected to each rail. As noted hereinbefore, this number should be even. Accordingly, the turns ratio m of the m:1:1 transformer is BIp/2Ih where Ip is the current capability of the primary circuit, and $I_h$ is the current required for each selected bit line, such as $A_1$, $B_1$, $A_2$, $B_2-A_n$, $B_n$.

Referring back to FIG. 1, when the transformer $T_1$ is selected, voltage passes along rails 10 and 11 to the bit drive lines and forward biases a set of selection diodes. For example, activation of transistors $Q_{12}$ and $Q_{15}$ of FIG. 4, forward biases diodes $D_1$ and $D_2$ connected to the line $A_1$ and all similarly poled diodes connected to bit lines on the rail 10, whereas activation of transistors $Q_{13}$ and $Q_{14}$ forward biases all oppositely poled diodes connected to the same bit lines. In that manner, current of proper polarity is driven through bit lines of selected word groups by a selected bipolar voltage switch. After the bit line currents have been established, the proper word line current is established, the delay being longer for a read cycle since a steady current must be present on the bit lines when the word drive current pulse is applied in order for the bit lines to be used to sense the binary digits of the word read out.

A schematic diagram for a bit drive arrangement in a 3-wire, 2 ½D memory system is illustrated in FIG. 3. Since such an arrangement is very much like that for the 2-wire system of FIG. 1, like elements are identified by like reference numerals. The difference is that a separate sense winding is provided for each bit position, such as sense windings 31 and 32 for respective bits 1 and 2. Sense amplifiers 33 and 34 connected to the windings 31 and 32 are conventional without DC restoring circuits at their inputs.

Figure 5:
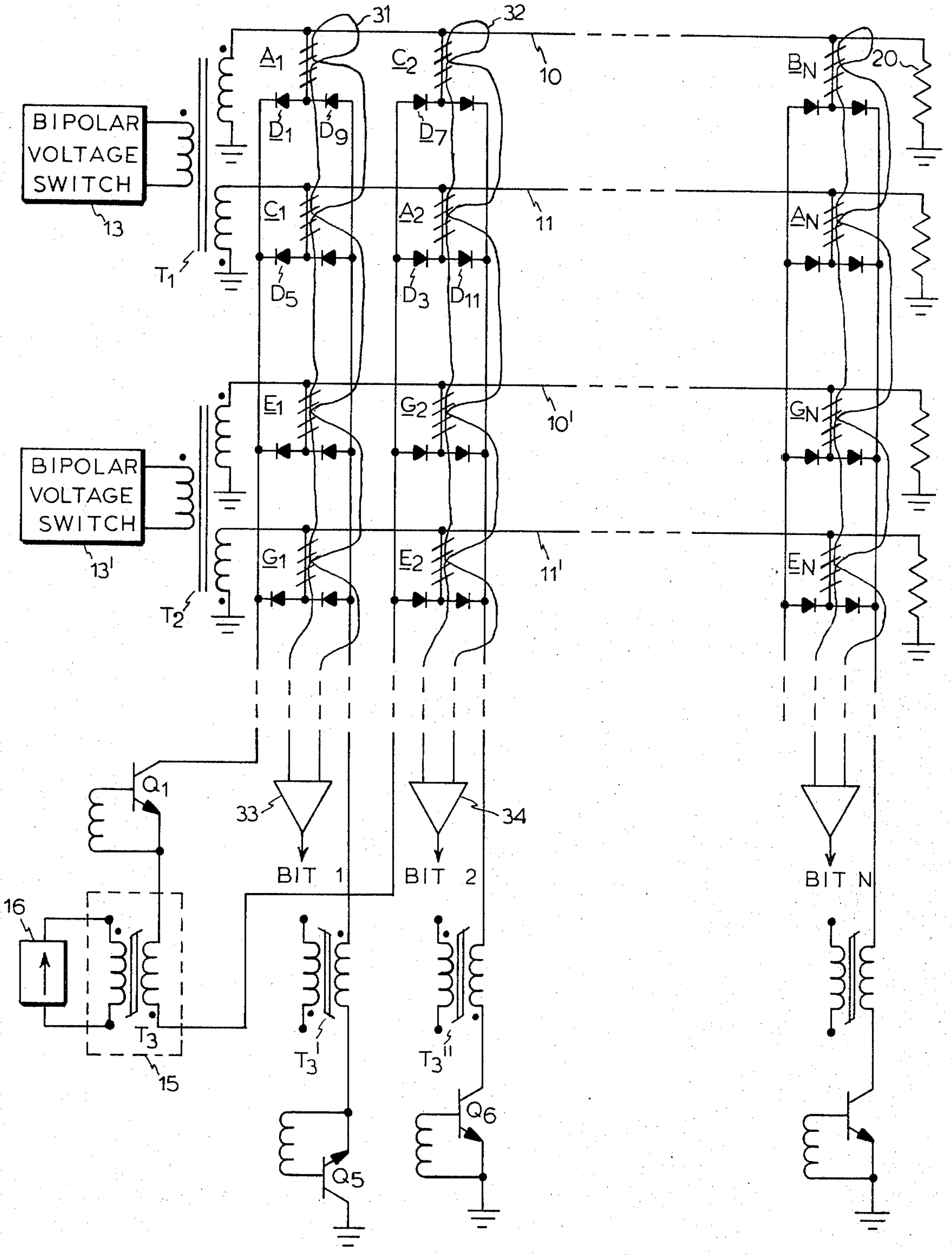
FIG. 5 is a schematic diagram of an illustrative embodiment of the present invention for selectively driving bit lines of a 3-wire, 2 ½D memory system.

Since conjugate lines are not connected to the sense amplifiers, only two word groups A and C can be accommodated, but the same number of bit drive lines may still be connected to the rails 10 and 11. Accordingly, one bipolar voltage switch may be used to read and store twice as many bits as in the 2-wire arrangement. For cancellation of shuttle noise in the sense windings which results from half-select bit drive current through unselected cores, the sense winding is provided through half the cores of a given bit drive line with one polarity and through the remaining half with opposite polarity in a conventional manner as schematically shown in FIG. 5.

In operation, a word group such as group A is selected as before. For a read cycle, the transistor $Q_1$ is turned on as before and read current through the bit drive line $A_1$ from the positive rail 10 is returned through the bit drive line $A_2$ to the negative rail 11. To read a word from group C, the polarities of the rails 10 and 11 are reversed. Selection diodes, such as diodes $D_1$ and $D_5$ prevent sneak current paths through unselected lines as in the arrangement of FIG. 1.

For a write cycle, the bit drive line selection is as for a read cycle, but with the polarities of the rails reversed. The transistor $Q_1$ remains cut off, and write switches, such as transistors $Q_5$ and $Q_6$ are turned on. For example, to store a word in group A, the bipolar voltage switch 13 is actuated to provide a negative voltage on rail 10 and a positive voltage on rail 11. When the transistors $Q_5$ and $Q_6$ are turned on, currents flow through the bit drive lines $A_1$ and $A_2$ via selection diodes $D_9$ and $D_{11}$.

The word drive lines are provided for a 3-wire arrangement in the same manner as for a 2-wire arrangement. However, since now only bit lines of groups A and C are connected to rails 10 and 11, only the one plane 22 of FIG. 3 is required. When the bit drive lines are folded in that plane to divide the cores of each bit line into two adjacent columns, the task of providing the sense winding for each bit line with cancellation of shuttle noise is greatly facilitated.

Although a particular embodiment of the invention has been described and illustrated herein, it is recognized that modifications and variations will be obvious to those skilled in the art. Consequently, it is intended that the claims be interpreted to cover such modifications and equivalents.

What is claimed is:

1. In a 2-wire, 2 ½D magnetic core memory having at least two word groups of bit drive lines, a given pair of bit drive lines being connected as a conjugate pair with one line in a bit position of one word group and the other line in a corresponding bit position of another word group, said pair being coupled to a sense amplifier by a balun of a transformer type, and said sense amplifier including a differential amplifying means having two input terminals, a DC restoring means in said sense amplifier comprising:

a first RC differentiating circuit coupling one terminal of said balun secondary winding to one terminal of said differential amplifying means, a second RC differentiating circuit coupling the other terminal of said balun secondary winding to the other terminal of said differential amplifying means, switching means connected between said two input terminals, and means for controlling said switching means to be normally conducting to maintain said two input terminals of said differential amplifying means at substantially the same potential with reference to circuit ground, and cutoff after read current switching transients have subsided in bit drive lines, whereby a signal thereafter induced in either of a pair of conjugate bit drive lines coupled to said balun secondary winding is amplified as a difference signal.

2. The combination of claim 1 wherein said switching means is a field-effect transistor having source and drain electrodes connected to separate ones of said two input terminals of said differential amplifying means, and said last named means is a gate electrode connected to receive a signal to control its cutoff period.

3. In a magnetic core memory, a plurality of rails associated in pairs for distributing voltage pulses of opposite polarities in a selected pair, a plurality of bit drive lines, a unique group of said bit drive lines connected to one rail of a given pair, and a unique group of said bit drive lines connected to the other rail of said given pair, means for simultaneously and selectively activating a given pair of rails with voltage pulses of selected and opposite polarities, whereby one rail of a given pair selected functions as a distribution line for a voltage pulse of a given polarity to bit lines connected thereto, and the other rail of said given pair functions as a distribution line for a voltage pulse of a polarity opposite said given polarity, switching means connected to said plurality of bit drive lines remote from said rails for selectively providing paths for read currents driven through said lines by said voltage pulses, switching means connected to said plurality of bit drive lines remote from said rails for selectively providing paths for write currents driven through said lines by said voltage pulses wherein said switching means for a read current in a given line connected to one rail of a given pair comprises a series read switch connecting said given line to a unique line connected to the other rail of said given pair, said given line being associated with a given bit position of a word stored in a unique group of lines, and said unique line being associated with a another bit position of said word stored in said unique group of lines, whereby half of the bits of said stored word are read from bit lines connected to said one rail of said given pair, and the other half from bit lines connected to said other rail of said given pair, whereby current through bit lines connected to said one rail of a given pair is returned through bit lines connected to said other rail of said given pair.

4. The combination of claim 3 wherein said series read switch connecting said given line of said one rail to said unique line of said other rail of said given pair connects an associated given line of said other rail of said given pair to an associated unique line of said one rail, and selection diodes are connected in series with each line thus connected to one side of said switch, and selection diodes are connected in series with each line thus connected to the other side of said switch for read currents of given polarities, whereby a word stored in a second unique group of lines may be read with one set of series switches, one switch for every 2 bits of a word read, which of two unique groups of lines read depending upon the polarities of said voltage pulses with which said rails of said selected pair are activated.

5. The combination of claim 4 wherein said switching means for write current in said lines comprises a plurality of write switches, a given write switch coupling to circuit ground each line connected to one side of a given read switch, lines thus coupled by said given write switch to circuit ground being connected to said write switch by selection diodes poled for write current through each line of a polarity opposite read current through the same line.

6. The combination of claim 5 including separate pulse stabilizing means connected in series with each switch of said read current switching means and a separate current pulse stabilizing means connected in series with each switch of said write current switching means.

7. The combination of claim 6 wherein, said given line of said one rail is connected to said one side of said read switch by one of said selection diodes poled for read current in a predetermined direction, said given line being associated with a second line connected to said one rail and connected to said one side of said read switch by one of said selection diodes posed for read current in the same direction as in said given line, and said given line and said second line are further connected to said switch by a unique balun, and said unique line of said other rail connected to said other side of said read switch is associated with a fourth line connected to said other rail, and each of said unique and said fourth lines is separately connected to said read switch by a separation of said selection diodes poled for read current in the same opposite direction as in said unique line given and said second lines, and said unique line and said fourth line are connected to said switch by a unique balun, whereby four word groups may be stored in said bit drive lines connected to said given rail pair.

8. The combination of claim 7 including a plurality of sense amplifiers wherein each of said baluns coupling associated bit drive lines to a read switch is of a transformer type having a secondary winding connected to a unique sense amplifier.

9. The combination of claim 8 wherein each of said sense amplifiers includes a differential amplifying means having two input terminals and a DC restoring circuit comprising:

a first RC differentiating circuit coupling one terminal of said balun secondary winding to one terminal of said differential amplifying means, a second RC differentiating circuit coupling the other terminal of said balun secondary winding to the other terminal of said differential amplifying means, and switching means connected between said two input terminals and means for controlling said switching means to be normally conducting to maintain said two input terminals of said differential amplifying means at substantially the same potential with reference to circuit ground, and cutoff after read current switching transients have subsided in bit drive lines, whereby a signal thereafter induced in either of a pair of associated bit drive lines coupled to said balun secondary winding is amplified as a difference signal.

10. The combination of claim 6 including a plurality of sense windings, one sense winding for all bit drive lines connected to all rail pairs and of a common bit position, and a separate sense amplifier connected to each sense winding.

11. In a 2 ½D magnetic core memory, a plurality of transformers, each transformer having a primary and two secondary windings, each of said secondary windings having two terminals with one terminal connected to circuit ground, said secondary windings of a given transformer being wound to provide substantially equal voltages of opposite polarity at their second terminals in response to a voltage pulse applied across the primary winding thereof, a plurality of paired rails, one pair associated with each transformer, a separate rail of each pair being connected to a different one of said second terminals of secondary windings of the associated one of said plurality of transformers, a first plurality of bit drive lines connected to a first rail of a given pair, each line passing through a separate group of cores associated with given bit positions of separate word groups, said given bit positions being odd bit positions of at least one word group and even bit positions of at least another word group, a second plurality of bit drive lines connected to a second rail of a given pair, each line passing through a separate group of cores associated with given bit positions of separate word locations, said given bit positions being even bit positions of said one word group and odd bit positions of said other word group, means for selectively activating the primary winding of a transformer connected to said given pair of rails with a voltage pulse of a selected polarity, and means connected to ends of said first and second plurality of bit drive lines for completing paths through said first plurality of lines for currents of a given polarity and through said second plurality of lines for currents of opposite polarity.

12. The combination of claim 11 wherein said last named means comprises read selection switches coupling bit drive lines of odd and even bit positions of a given word group in pairs, a given switch being connected at one end to bit drive lines connected to both rails of said given pair, and of corresponding odd bit positions, by selection diodes poled for read current through said given switch of one polarity, and connected at the other end to bit drive lines connected to both rails of said given pair of even bit position by selection diodes poled for read current through said given switch of said one polarity, whereby a tight controlled current path is selectively provided through an odd bit line of a given word group and an even bit line of said given word group.

13. The combination of claim 12 wherein four bit drive lines connected to said given pair of rails, and of and of odd bit positions in four word groups, are connected to said switch at said one end through a first transformer-type balun having ends of a primary winding connected to said four odd bit drive lines to form first and second conjugate pairs, a given conjugate pair having both bit lines connected to the same rail, a center tap of said primary winding connected to said switch, and a secondary winding connected to a sense amplifier, and wherein four bit drive lines connected to said given pair of rails and of even bit positions in said four word groups are connected to said switch at said other end through a second transformer-type balun having ends of a primary winding connected to said four even bit drive lines to form third and fourth conjugate pairs, a given conjugate pair having both bit lines connected to the same rail, a center top of said primary winding connected to said switch, and a secondary winding connected to a sense amplifier.

14. The combination of claim 13 including a third transformer-type balun having first and second input terminals connected to said first conjugate pair of bit drive lines, respectively, by selection diodes poled for currents of a polarity opposite said read current through said first conjugate pair of bit drive lines and having said first and second input terminals connected to said second conjugate pair of bit drive lines, respectively, by selection diodes poled for currents of a polarity opposite said read current through said second conjugate pair of bit drive lines, and a single output terminal, and further including a write selection switch coupling said single output terminal to circuit ground.

15. The combination of claim 13 including a current pulse stabilizing means connected in series with said read selection switch between said first and second baluns.

* * * * *